United States Patent [19]

Zavisza

[11] 4,263,190

[45] Apr. 21, 1981

[54] ADHESION OF TEXTILE CORDS TO RUBBER USING A BUTADIENE-STYRENE VINYLPYRIDINE RUBBER LATEX AND AN ALDEHYDE CONDENSATE-GLYOXAL REACTION PRODUCTS MIXTURE

[75] Inventor: Daniel M. Zavisza, Basking Ridge, N.J.

[73] Assignee: American Cyanamid Company, Stamford, Conn.

[21] Appl. No.: 106,431

[22] Filed: Dec. 26, 1979

[51] Int. Cl.³ .............................................. C08L 25/10
[52] U.S. Cl. ............................... 260/29.4 UA; 428/395
[58] Field of Search ............... 260/29.4 UA, 29.7 NR; 428/395

[56] References Cited

U.S. PATENT DOCUMENTS

| | | | |
|---|---|---|---|
| 3,194,294 | 7/1965 | Gils | 260/29.4 UA |
| 3,260,565 | 7/1966 | Beachem | 428/264 |
| 3,361,617 | 1/1968 | Kaizerman | 260/29.4 UA |
| 3,773,612 | 11/1973 | Avis | 260/29.4 UA |

*Primary Examiner*—Paul R. Michl
*Attorney, Agent, or Firm*—Frank M. Van Riet

[57] ABSTRACT

A cord dip composition comprising a styrene-butadiene-vinyl pyridine terpolymer latex and a mixture of an aldehyde condensate and a glyoxal reaction product, are disclosed.

6 Claims, No Drawings

ADHESION OF TEXTILE CORDS TO RUBBER USING A BUTADIENE-STYRENE VINYLPYRIDINE RUBBER LATEX AND AN ALDEHYDE CONDENSATE-GLYOXAL REACTION PRODUCTS MIXTURE

BACKGROUND OF THE INVENTION

In making cord-reinforced, vulcanized rubber products, for example automobile tires, strength under stress is critical. In many instances, it is found that the bond between the cord and the rubber is the point at which tire failure occurs.

The art of bonding tire cord to rubber is very complex, however, it is generally recognized at present that the "so-called" RFL system is the most widely used method of adhering textile cords to rubber. The RFL system (see U.S. Pat. No. 3,968,295, for example) comprises a dip composition of a butadiene-styrene-vinylpyridine rubber latex and a resorcinol-formaldehyde resin. In particular, the latex usually comprises 15–20% styrene, 65–75% butadiene, and 10–15% vinyl-pyridine.

Resorcinol is a very expensive commodity which is also in short supply. Furthermore, it exhibits certain undesirable toxicological characteristics. Moreover, and most importantly, the presently used cord dip compositions containing the resorcinol-formaldehyde resins must be aged before use, and their useful lifetime, once prepared, is a matter of only a few days at best, depending on the ambient temperature at which they are stored.

Therefore, a cord dip composition in which the resorcinol-formaldehyde resin is replaced, which provides at least as good adhesion of cord to rubber as the present RFL system, at lower cost and which does not require aging would solve a long-felt need.

DESCRIPTION OF THE INVENTION

The present invention provides a tire-cord dipping composition comprising a styrene-butadiene-vinylpyridine (15–20%/65–75%/10–15%) latex and a mixture of (a) an aldehyde condensate, and (b) a glyoxal-reaction product, in certain proportions, defined below.

The latex used in the present invention is the conventional latex used in the RFL system described hereinabove. The latex is well-known and described in U.S. Pat. Nos. 2,561,215; 2,615,826; and 3,968,295, hereby incorporated herein by reference.

The aldehyde condensate useful in the practice of the invention include those produced by condensing melamine and formaldehyde and defined by the following formula:

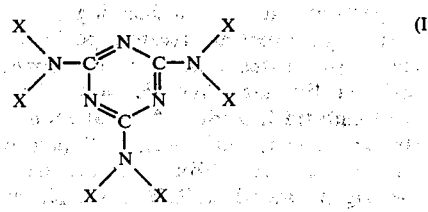

wherein each X is individually selected from hydrogen, hydroxymethyl, or alkoxymethyl (1 to 4 alkoxy carbon atoms), with the proviso that the molecule must contain at least two reactive hydroxymethyl or alkoxymethyl groups. The condensates are also well-known and prepared by well-known methods. They are described in U.S. Pat. Nos. 2,339,203 and 3,329,622, among others, hereby incorporated herein by reference. In general, from about 2 to 6 molar proportions of formaldehyde are reacted together with one molar proportion of melamine to form a condensate which may be further condensed with 0–6 molar proportions of a lower ($C_1$–$C_4$) alcohol to give an etherified polymethylol melamine. The melamine-formaldehyde condensates may also be defined as including those compositions within the range $MF_2R_0$ to $MF_6R_6$ wherein M=melamine, F=formaldehyde, and R=alkyl ($C_1$–$C_4$). The condensates within the above definition range from dimethylol melamine to hexakis (alkoxymethyl)-melamine. Preferred melamine condensates include $MF_3Me_3$ and $MF_6Me_6$, which are, respectively tris (methoxymethyl) melamine and hexakis (methoxymethyl) melamine. The condensates are preferably employed as aqueous solutions, and range from liquid materials to resinous reaction products.

Additional aldehyde condensates which are useful herein include those produced by condensing urea and formaldehyde and represented by the formula:

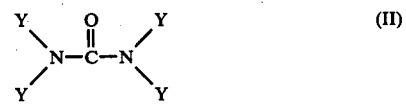

wherein each Y is individually selected from hydrogen, hydroxymethyl, and alkoxymethyl ($C_1$–$C_4$ alkoxy carbon atoms), with the proviso that at least two reactive hydroxymethyl or alkoxymethyl groups are present per molecule. In general, from 2 to 4 molar proportions of formaldehyde are reacted with one molar proportion of urea to form a condensate product which may be further condensed with 0–4 molar proportions of a lower alcohol ($C_1$–$C_4$) alcohol to give an etherified polymethylol urea. The urea-formaldehyde condensates may also be defined as including those compounds within the range $UF'_2$ to $UF'_4R'_4$ wherein U=urea, F'=formaldehyde, and R'=alkyl ($C_1$–$C_4$). These condensates range from dimethylol urea to tetrakis-(alkoxymethyl) urea. Preferred urea-formaldehyde condensates include dimethylol urea and tetrakis (methoxymethyl) urea.

In the practice of the present invention, melamine-formaldehyde condensates are preferred.

The glyoxal-urea reaction products which are useful in the present invention, comprise the reaction products of from about 0.1 to 10, preferably 0.5 to 4, molar proportions of urea per molar proportion of glyoxal. Reaction products from 1 to 1.5 molar proportions of urea per molar proportion of glyoxal, are especially preferred. A desirable species is the compound 4,5-dihydroxy-2-imidazolidinone:

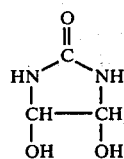

A method for its production is disclosed in U.S. Pat. No. 3,260,565.

Reaction products of glyoxal, urea, and formaldehyde, comprising 0.1 to 10 molar proportions of urea and 0.01 to 2 molar proportions of formaldehyde per molar proportion of glyoxal, are also useful. Preferred species include 1-methylol- and 1,3-dimethylol-4,5-dihydroxy-2-imidazolidinone:

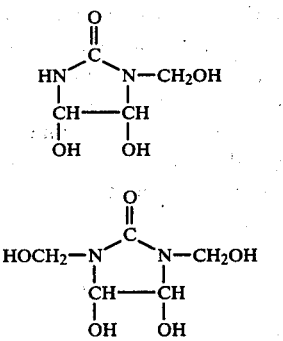

In the practice of the present invention, 4,5-dihydroxy-2-imidazolidinone and 1,2-dimethylol-4,5-dihydroxy-2-imidazolidinone are preferred species of glyoxal-urea reaction products.

The aldehyde condensate and the glyoxal reaction product are combined in the ratio of about 9:1 to 1:9, the preferred ratio being about 1:1. The mixture is added to the rubber latex in an amount ranging from 10–50 parts of solids per 100 parts of rubber solids in the latex. Neither component, used in the latex alone, provides adhesion results equivalent to the standard RFL system or to the combination of the invention.

The textile cords, which may be coated with the adhesive composition of the invention, include cotton, rayon, nylon, and polyester tire cord. The invention is particularly advantageous with polyester, since it is one of the most difficult tire cords to adhere to rubber in that polyester tire cord contains no reactive functional groups in the polymer molecule with which to bond with the adhesive. Therefore, it is standard practice in the industry to activate or precoat polyester tire cord with a substance which contains functional groups reactive with the adhesive. The most common procedures are the use of a blocked isocyanate coating, more specifically, an isocyanate-epoxy coating, or a chlorinated phenolic treatment. These are described in more detail below.

The following procedures are used to evaluate adhesion according to the present invention.

A. Preparation of Conventional RFL Control Dip Compositions

Cords are dipped using a composition as follows:

| Resin | Parts (wt) | |
|---|---|---|
| | Dry | Wet |
| Deionized water | — | 104 |
| Resorcinol | 3.8 | 3.8 |
| 37% Formaldehyde | 1.6 | 4.3 |
| 10% Sodium hydroxide | 0.33 | 3.3 |
| | 5.73 | 115.4 |
| Dip Composition | | |
| Vinylpyridine latex* | 33.9 | 82.8 |
| Resin composition (above) | 5.73 | 115.4 |
| | 39.63 | 198.2 |

*Styrene-butadiene-vinylpyridine terpolymer latex

The resin solution is aged for 4 hours before addition to the latex. The dip composition is aged for a minimum of 16 hours at room temperature before use.

Polyester tire cords are pretreated with an iso-cyanate-epoxy coating composition (1) as follows:

| | | Parts (wt) | |
|---|---|---|---|
| | | Dry | Wet |
| 1. | Blocked isocyanate* | 38.72 | 38.72 |
| | Wetting Agent (75%) | 1.28 | 1.70 |
| | Water | — | 59.6 |
| | | 40.00 | 100.02 |
| 2. | (1) above (isocyanate solution) | 3.6 | 9.0 |
| | Epoxy resin** | 1.4 | 1.4 |
| | Gum tragacanth (2%) | .04 | 2.0 |
| | Water | — | 87.6 |
| | | 5.04 | 100.0 |

*Methylenebis (phenylisocyanate) blocked with 2 moles of phenol
**Mixture of branched di- and tri-epoxides made by condensation of epichlorohydrin and glycerine; epoxide equivalent = 150–170

The cords are cured for one minute at 220°–230° and then coated with the RFL Control Dip Composition, above, and cured again for one minute at 220°–230° C.

B. Preparation of Dip Compositions Using the Compositions of this Invention

Procedures similar to the Control Dip, above, are used to coat the cords except that the resorcinol-formaldehyde resin thereof is replaced by the condensate-reaction product mixture of the present invention, except that neither resin aging nor dip aging is required. The total solids content of the dip composition is usually about 20%.

C. Method for Testing Static Adhesion of Textile Cords to Rubber (H-Test); ASTM D-2138-72, Sections 5–10

The H-Test is designed to measure the force required to pull a cord, in the direction of its axis, from a strip of rubber in which the ends of the cord are embedded. The property measured is a shearing force acting at the cord-rubber interface. The test specimen consists of two end-strips of rubber with an interconnecting cord, resembling the letter "H". Each specimen has a single cord embedded in the center of each of the two end strips of rubber, which are ¼"×1" (approx.). The specimens are vulcanized for 18–20 minutes at 307° F. and then aged for at least 16 hours at 23°±2° C. prior to testing. Data are recorded as pounds of pull (lbs force) to separate the cord from the rubber, or in Newtons (10 N=2.248 lbs force).

D. Method of Testing Adhesion of Solution Dipped Tire Cord to Rubber (Uniroyal Hot Peel Test A strip of 15–20 gauge tire stock, about 4" wide, is covered with dipped tire cords (about 25–28 cords/inch) laid perpendicular to the strip. Another strip of rubber stock is applied over the cords. This procedure is repeated so that a laminate is obtained consisting of two sets of cord between three strips of rubber. The laminate is vulcanized for 8 minutes at 165° C. and 200-300 lbs (psi) pressure. After cooling, specimens 1"×3" are cut for testing, discarding ½" on either end of the strip. The test strips are then heated for 20-30 minutes at 121° C. before testing on an Instron tensile tester by peeling the rubber away from the cords. The force required to peel the rubber away is a measure of the adhesive strength of the bond. Following separation, the appearance of the peel is rated on a scale of 1-5 (5=best) as follows:

5 = All rubber tear, no bare cord
4 = 75% rubber tear, 25% bare cord
3 = 50% rubber tear, 50% bare cord
2 = 25% rubber tear, 75% bare cord
1 = No rubber tear, 100% bare cord In the following examples the rubber composition to which the cords are bonded for the static adhesion test (H-Test) is as follows:

|  | Parts by Weight |
|---|---|
| Natural rubber | 70 |
| Styrene-butadiene | 30 |
| Carbon black | 30 |
| Zinc oxide | 5 |
| Stearic acid | 2 |
| Processing oil | 4 |
| Antioxidant | 4 |
| Sulfur | 1.5 |
| N-Oxydiethylenebenzothiazole-2-sulfenamide | 0.8 |

EXAMPLES 1-7

Polyester tire cords (1000 Denier, 3 ply) are pretreated with isocyanate/epoxy coating composition (1) described above, and then top coated with the compositions described in Table I, below. Data are given for both static adhesion (H-Test) in Newtons and the Hot Peel Test, the force also given in Newtons (10 N = 1.02 Kg-force).

The condensates and reaction products used in the examples are identified as follows:
A. Tris (methoxymethyl) melamine
B. 1,3-dimethylol-4,5-dihydroxy-2-imidazolidinone
C. Hexakis (methoxymethyl) melamine
D. 4,5-Dihydroxy-2-imidazolidinone The control against which adhesion is evaluated is the conventional RFL system: styrene-butadiene-vinylpyridine terpolymer (18/70/12) latex plus resorcinol-formaldehyde resin.

TABLE I

Evaluation of Condensates and Reaction Products in Admixture with Vinylpyridine Latex for Adhesion of Polyester Cord to Rubber

| Example | Resin | Parts* | H-Test Static Adhesion (N) | Hot Peel Test Rating | Force (N) |
|---|---|---|---|---|---|
| 1 Z | RFL Control** | — | 135 | 4.5-5 | 142 |
| 2 Z | A | 3 | 37 | 1 | 80 |
| 3 Z | A | 5 | 18 | 1 | 80 |
| 4 Z | B | 5 | 50 | 4.0-4.5 | 133 |
| 5 | A/B | 2.5/2.5 | 134 | 5 | 210 |
| 6 | C/B | 2.5/2.5 | 136 | 5 | 151 |
| 7 | A/D | 2.5/2.5 | 129 | 5 | 145 |

*Parts, by weight, per 20 parts (wt) of latex solids; latex is styrene-butadiene-vinylpyridine terpolymer (18/70/12)
**Adhesion data shown are typical values for RFL system on isocyanate/-epoxy pretreated polyester cord. Z = Comparative Example The data in Table I illustrate that the combinations of tris(methoxymethyl) melamine with 1,3-dimethylol-4,5-dihydroxy-2-imidazolidinone (A/B); hexakis(methoxymethyl)-melamine with 1,3-dimethylol-4,5-dihydroxy-2-imidazolidinone (C/B); and tris(methoxymethyl melamine with 4,5-dihydroxy-2-imidazolidinone (A/D) exhibit better adhesion of polyester tire cord to rubber, according to both the H-Test and the Hot Peel Test, than the conventional RFL system, or the tris (methoxymethyl) melamine and 1,3-dimethylol-4,5-dehydroxy-2-imidazolidinone, alone.

EXAMPLES 8-11

The procedures of Examples 1-7 are repeated using polyester cord pretreated with a chlorinated phenolic resin (5% aqueous solution; cured 3 minutes at 220°-230° C.). Results are shown in Table II. The components A, B, C & D are as specified above.

TABLE II

Evaluation of Condensates and Reaction Products in Admixture with Vinylpyridine Latex for Adhesion of Polyester Cord to Rubber

| Example | Resin | Parts* | H-Test Static Adhesion (N) | Hot Peel Test Rating | Force(N) |
|---|---|---|---|---|---|
| 8 Z | RFL Control | 3.5 | 44 | 4-5 | 130 |
| 9 Z | A | 5 | 99 | 5 | 159 |
| 10 | C/B | 2.5/2.5 | 85 | 4-5 | 133 |
| 11 | A/B | 2.5/2.5 | 124 | 5 | 164 |

*Parts, by weight, of resin per 20 parts of latex solids
Z = Comparative Example The data illustrate that the resin combination of tris(methoxymethyl) melamine and 1,3-dimethylol-4,5-dihydroxy-2-imidazolidinone (A/B) is equal to or better than the RFL system, according to both the H-Test and Hot Peel Test, in adhesion of chlorinated phenolic resin pretreated polyester cord to rubber.

EXAMPLES 12-21

Combinations at 5 parts per 20 parts of latex solids, of (A) tris(methoxymethyl) melamine and (C) hexakis(methoxymethyl) melamine with (B) 1,3-dimethylol-4,5-dihydroxy-2-imidazolidinone are evaluated to determine the effective ratios of the combinations to rubber latex solids for adhesion of isocyanate/epoxy pretreated polyester cord to rubber. The data are obtained using the H-Test for static adhesion in Newtons. Data are given in Table III.

TABLE III

Evaluation of Condensate-Reaction Product Ratio in Resin Latex Compositions for Adhesion of Polyester Cord to Rubber

| Example | Resin Combination | Ratio (wt) | H-Test Adhesion(N) |
|---|---|---|---|
| 12 Z | C/B | 100/0 | 27 |
| 13 | C/B | 80/20 | 127 |
| 14 | C/B | 75/25 | 137 |
| 15 | C/B | 50/50 | 137 |
| 16 | C/B | 20/80 | 118 |
| 17 Z | C/B | 0/100 | 50 |
| 18 Z | A/B | 100/0 | 80 |
| 19 | A/B | 50/50 | 133 |
| 20 | A/B | 30/70 | 118 |
| 21 Z | A/B | 0/100 | 50 |

Z = Comparative Example

EXAMPLES 22-31

Examples 12-21 are repeated at the same concentrations using the Hot Peel Test instead of the H-Test to evaluate adhesion of the cord to rubber. Table IV shows the appearance rating versus the condensate-reaction product ratio.

TABLE IV

Evaluation of Condensate-Reaction Product Ratio in Resin Latex Compositions for Adhesion of Polyester Cord to Rubber

| Example | Resin Combination | Ratio (wt) | Hot Peel Test Rating |
|---|---|---|---|
| 22 Z | C/B | 100/0 | 1 |
| 23 | C/B | 80/20 | 4 |
| 24 | C/B | 75/25 | 5 |
| 25 | C/B | 50/50 | 5 |
| 26 | C/B | 20/80 | 4.5 |
| 27 Z | C/B | 0/100 | 4 |
| 28 Z | A/B | 100/0 | 1 |
| 29 | A/B | 50/50 | 5 |
| 30 | A/B | 30/70 | 5 |
| 31 Z | A/B | 0/100 | 4 |

Z = Comparative Example

EXAMPLES 32-35

Combinations of (E) dimethylol urea, (F) tris-(hydroxymethyl) melamine, and (B) 1,3-dimethylol-4,5-dihydroxy-2-imidazolidinone are evaluated by the Hot Peel Test with isocyanate-epoxy pretreated polyester cords in a manner similar to Examples 1-7. Table V gives the results of the evaluation.

TABLE V

Evaluation of Condensates and Reaction Products in Admixture with Vinylpyridine Latex for Adhesion of Polyester Cord to Rubber

| Example | Resin | Parts | Hot Peel Test Rating | Force (N) |
|---|---|---|---|---|
| 32 Z | E | 5 | 1 | 33 |
| 33 Z | E/F | 2.5/2.5 | 1 | 33 |
| 34 | E/B | 2.5/2.5 | 4.5 | 178 |
| 35 | F/B | 2.5/2.5 | 4 | 144 |

Z = Comparative Example

The data illustrate that (1) dimethylol urea, alone or combined with tris(hydroxymethyl) melamine, is ineffective in providing adequate cord/rubber adhesion, and (2) that dimethylol urea or tris (hydroxymethylol) melamine combined with 1,3-dimethylol-4,5-dihydroxy-2-imidazolidinone are effective in promoting cord/rubber adhesion.

EXAMPLES 36-46

The procedure of Example 5 is again followed except that different condensates and different reaction products are employed in 50/50 mixtures. The various mixtures are set out in Table VI, below. In each instance, results comparable to those shown in Table I, are observed.

| Example | Aldehyde Condensate | Reaction Product |
|---|---|---|
| 36 | hexakis(hydroxymethyl) melamine | 4,5-dihydroxy-2-imidazolidinone |
| 37 | tris(methoxymethyl) melamine | 1:1 molar ratio-glyoxal/urea |
| 38 | hexakis(butoxymethyl) melamine | 2:1:1 molar ratio-urea/formaldehyde/glyoxal |
| 39 | hexakis(methoxymethyl) melamine | 1-methylol-4,5-dihydroxy-2-imidazolidinone |
| 40 | bis(hydroxymethyl) melamine | 10:08:1 molar ratio-urea/formaldehyde glyoxal |
| 41 | tetrabutoxymethyl urea | .01:.01:1 molar ratio-urea/formaldehyde/glyoxal |
| 42 | tetra(methoxymethyl) melamine | 1,3-dimethylol-4,5-dehydroxy-2-imidazolidinone |
| 43 | dibutylol urea | 1:4 molar ratio-glyoxal/urea |
| 44 | tris(ethoxymethyl) melamine | 4:2:1 molar ratio-urea/formaldehyde/glyoxal |
| 45 | dimethoxymethyl urea | 1-methylol-4,5-dehydroxy-2-imidazolidinone |
| 46 | tetramethylol urea | 1:10 molar ratio-glyoxal/urea |

I claim:

1. A composition which consists essentially of (I) a styrene-butadiene-vinylpyridine terpolymer latex and (II) a mixture of from about 10 to 90 percent, by weight, based on the total weight of said mixture, of (A) an aldehyde condensate comprising (1) those represented by formula:

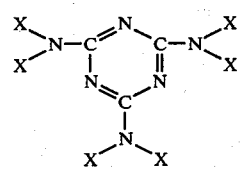

wherein each X represents hydrogen, hydroxymethyl, or alkoxymethyl ($C_1$-$C_4$ alkoxy), or (2) those represented by formula:

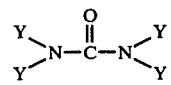

wherein each Y is selected from hydrogen, hydroxymethyl, or alkoxymethyl ($C_1$-$C_4$ alkoxy), and from about 90 to 10 percent, by weight of (B) a glyoxal reaction product comprising: (a) those which are the products of reaction of from about 0.1 to 10 molar proportions of urea with one molar proportion of glyoxal or (b) those which are the products of reaction of 0.1 to 10 molar proportions of urea and from 0.01 to 2 molar proportions of formaldehyde with one molar proportion of glyoxal; provided that each of said (A) and (B) in said mixture contains at least two reaction hydroxyl, hydroxymethyl, or alkoxymethyl groups per molecule.

2. A composition according to claim 1 wherein said (A) is hexakismethoxymethyl melamine.

3. A composition according to claim 1 wherein said (A) is tris(methoxymethyl) melamine.

4. A composition according to claim 1 wherein said (B) is 4,5-dihydroxy-2-imidazolidinone.

5. A composition according to claim 1 wherein said (B) is 1,3-dimethylol-4,5-dihydroxy-2-imidazolidinone.

6. A method for forming a strong adhesive bond between a vulcanized natural or synthetic rubber composition and a textile fiber embedded therein which comprises dipping the textile fiber in the composition of claim 1, imbedding the so-dipped fiber in a vulcanizable rubber composition and vulcanizing said rubber composition.

* * * * *